July 16, 1935.  R. WIDERÖE  2,008,532
PROTECTIVE ARRANGEMENT FOR ALTERNATING CURRENT POWER SYSTEMS
Original Filed May 3, 1933
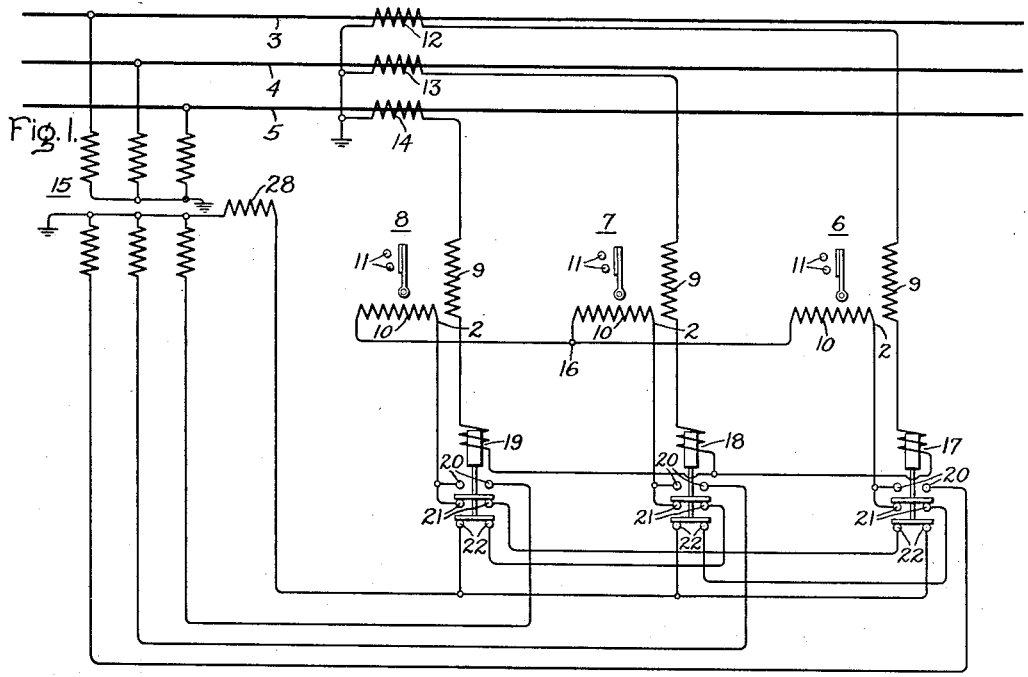
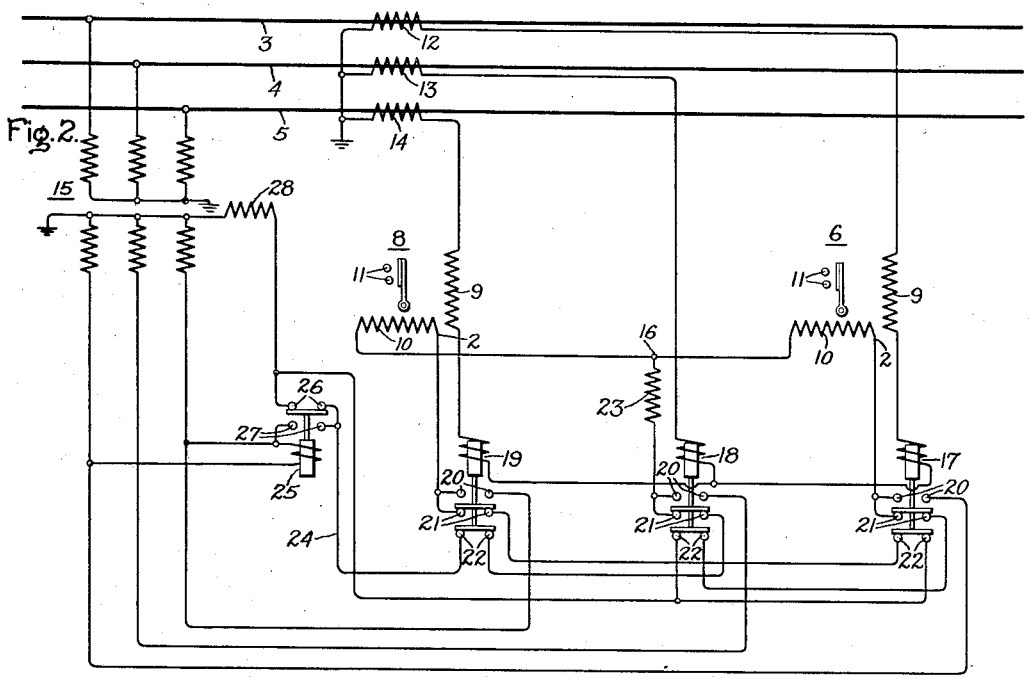
Inventor:
Rolf Wideröe,
by Charles E. Tullar
His Attorney.

Patented July 16, 1935

2,008,532

UNITED STATES PATENT OFFICE 2,008,532

PROTECTIVE ARRANGEMENT FOR ALTERNATING-CURRENT POWER SYSTEMS

Rolf Wideröe, Vinderen-Oslo, Norway, assignor to General Electric Company, a corporation of New York Application May 3, 1933, Serial No. 669,247. In Germany May 19, 1932. Renewed January 11, 1935

6 Claims. (Cl. 175—294)

My invention relates to improvements in protective arrangements for alternating-current power systems and more particularly to improvements in protective arrangements wherein selectivity is obtained by distance relays which respond to an impedance characteristic of the system. One object of my invention is to provide an improved protective arrangement whereby, with a minimum number of distance relays and associated auxiliary devices, to maintain the impedance response characteristic of the distance relays substantially constant for faults at a given location independently of the number of phase conductors involved in such faults. In general my invention relates to improvements in protective arrangements such as are disclosed in the copending application of Erich Gross, Serial No. 605,060, filed April 13, 1932, and assigned to the same assignee as this invention.

My invention will be better understood from the following description when considered in connection with the accompanying drawing and its scope will be pointed out in the appended claims.

In the accompanying drawing, Fig. 1 illustrates diagrammatically an embodiment of my invention as applied to a polyphase alternating-current power system and Fig. 2 illustrates diagrammatically a modification of the embodiment of my invention shown in Fig. 1.

Referring now to Fig. 1, a polyphase alternating-current power system, shown schematically by three-phase conductors 3, 4, and 5, is provided with a protective arrangement embodying my invention. As shown in Fig. 1, this protective arrangement comprises distance relays 6, 7, and 8. These are shown schematically by cooperating current and voltage coils 9 and 10 respectively and associated contacts 11. These contacts may be arranged to control circuit-interrupting means in the circuit of the conductors 3, 4, 5 in any suitable manner, examples of which are well known to the art. Each of the voltage coils 10 preferably has substantially the same impedance. Where necessary for energizing the current coils 9 and other current-responsive devices, current transformers 12, 13, and 14 associated with the respective conductors 3, 4, and 5 may be provided. Likewise, for energizing the voltage coils 10 in accordance with the respective system voltages, there may be provided suitable voltage-transforming means, such as the polyphase potential transformer 15.

In accordance with my invention, one terminal of each of the voltage coils 10 is connected to a common point 16. Also in accordance with my invention, I provide means responsive to faults on the power system conductors 3, 4, 5, such as fault-responsive relays 17, 18, 19 which are so arranged to control the connections of the other terminal of each of the voltage coils 10 as to maintain the impedance-response characteristic of the distance relays 6, 7, and 8 substantially constant for faults occurring at a given location independently of the number of conductors involved in such faults. Although the fault-responsive relays 17, 18, and 19 may be of any suitable type they are for the sake of example shown as over-current relays respectively associated with the distance relays, 6, 7, and 8 and accordingly with the phase conductors 3, 4, and 5 with which these distance relays are respectively associated.

Each of the fault-responsive or starting relays 17, 18, and 19 is provided with circuit-controlling transfer means including contacts 20, 21, and 22. These contacts are so arranged as normally to connect the other or free terminal 2 of each voltage coil to a neutral point derived from the system, for example by the potential transformer 15, through the contacts 21 of the associated fault-responsive relay and the contacts 22 of the fault-responsive relay of the phase next in cyclic order. Thus, it will be observed that the voltage coils 10 are star-connected for a three-phase system and normally connected to ground through the neutral of the secondary winding of the potential transformer 15.

Assuming now a fault, such as a short circuit, between phase conductors 3 and 4, then each of the fault-responsive relays 17 and 18 will operate to open its contacts 21 and 22 and close its contacts 20. Consequently, the other terminal 2 of the voltage coil 10 of each of the distance relays 6 and 7 is connected to the phase conductor of the system from which the cooperating current coil of the respective distance relay is energized. In other words, the voltage coils 10 of the distance relays 6 and 7 are connected in series with each other and their outside terminals 2 are connected for energization in accordance with the voltage between the conductors 3 and 4. The voltage applied to each of the voltage coils of the relays 6 and 7 is therefore one-half of the voltage between the phase conductors 3 and 4 while the currents in the current coils 9 of these distance relays 6 and 7 are those in the respective phase conductors 3 and 4. Inasmuch as the fault-responsive relay 19 remains inactive, the voltage coil 10 of the distance relay 8 is not energized. Similarly, for a short circuit between any two phase conductors, the two distance relays associated with these conductors will have their voltage coils respectively energized in accordance with one-half of the voltage between the faulted conductors and their current coils in accordance with the currents in the respective conductors.

In case of a ground fault involving one phase conductor, for example, the phase conductor 5, only the fault-responsive relay 19 associated with this conductor will operate. The operation of the relay 19 through the opening of its contacts 21 and 22 and the closing of its contacts 20 separates the other terminal of the voltage coil 10 of the distance relay 8 from the rest of the voltage coils and connects it, in effect, through one phase winding of the potential transformer 15 to the phase conductor 5 at fault while the common point 16 of the voltage windings 10 remains connected to the neutral point of the secondaries of the transformer 15 through the contacts 21 of the fault-responsive relay 17 and the contacts 22 of the fault-responsive relay 18. Thus, the voltage windings 10 of the distance relays 6 and 8 are connected in series with each other and with their terminals 2 across a voltage which is proportional to the voltage to ground of the phase conductor 5. Consequently, each of the voltage windings 10 of these relays is energized in accordance with one-half of this voltage while the current winding 9 of the distance relay 8 is energized in accordance with the fault current. The impedance characteristic of the distance relay 8 is accordingly the same as it would be for a fault which involved a phase conductor 5 and one of the other phase conductors.

In case of a three-phase short circuit, that is to say a fault involving all three phase conductors 3, 4, and 5 directly, each of the fault-responsive relays 17, 18 and 19 operates to open its contacts 21 and 22 and to close its contacts 20. Consequently, the other terminal of each of the voltage coils 10 of the distance relays is connected, in effect, to the associated phase conductor of the system through the corresponding secondary winding of the potential transformer 15. Thus, considering any two voltage coils, such as those of the distance relays 7 and 8, it will be observed that these coils are connected in series with each other and across a voltage dependent on the voltage between the phase conductors 4 and 5 with which the distance relays 7 and 8 are associated. Consequently, the voltage coil of each of the distance relays is energized in accordance with the voltage to ground of the phase conductor with which the distance relay is associated. The impedance response characteristic is accordingly unchanged.

In case of a double earth fault between the phase conductors 3 and 5, only the phase conductor 3 in one station is involved. The voltage coil 10 of the distance relay 6 is then connected to the phase conductor 3 through the contacts 20 of the fault-responsive relay 17, the secondary of the potential transformer 15 associated with the phase conductor 3, the contacts 22 of the fault-responsive relay 19, the contacts 21 of the fault-responsive relay 18, and the voltage coil 10 of the distance relay 7. Thus, the voltage coil 10 of the distance relay 6 nearest the fault receives half the line to ground voltage of the phase conductor 3 and operates as it would on a single conductor to ground fault.

The arrangement may be used particularly where the system has a neutral point grounded through little or no impedance since in this case any earth fault would lead to a short circuit and thereby cause the apparatus to operate as if there were a double earth fault in a system grounded through a high impedance.

As shown in Fig. 2, the desired protection can also be obtained with only two distance relays, particularly when they are used in connection with compensated networks. In place of the voltage coil of the distance relay associated with one of the phase conductors, for example phase conductor 4, there may be substituted means 23 having an impedance equivalent to the impedance of a distance relay voltage coil. Then with a short circuit involving two phase conductors, for example 3 and 4 or 4 and 5, only one of the distance relays 6 or 8 will operate, while in case of a short circuit between the phase conductors 3 and 5 and a three-phase short circuit, both of the distance relays 6 and 8 will operate, the operation being as explained in connection with Fig. 1 except for the substitution of the impedance device 23.

In order that the arrangement may work with the proper selectivity even with a double earth fault, that is, a fault which involves two different phase conductors in different sections, I may so arrange that only the distance relay in one section operates. In the conductor 24 which extends from one of the bottom contacts 22 of the fault-responsive relay 19, there are provided the contacts 26 and 27 controlled by a fault-responsive means 25 which is so arranged as to open contacts 26 and close contacts 27 when there is a double earth fault between the phase conductors 3 and 5. Thus, when such a double earth fault occurs, with fault current in the phase conductor 5, then the voltage coil 10 of the distance relay 8 associated with this conductor is connected for energization in accordance with the voltage to ground of the phase conductor 5 through the contacts 20 of the fault-responsive relay 19, the secondary of the potential transformer 15 which corresponds to the phase conductor 5, the contacts 22 of the fault-responsive relay 18, the contacts 21 of the fault-responsive relay 17, and the voltage winding 10 of the distance relay 6. The voltage coils 10 of the distance relays are thus connected in series and the correct impedance-response characteristic is obtained. The relay 17 in another station through which the fault current of the phase conductor 3 flows at that station will operate to open its contacts 21 and 22 and close its contacts 20. In this case the voltage coil 10 of the distance relay 6 is connected with the phase conductor 3 through the contacts 20 of the fault-responsive relay 17, the secondary windings of the potential transformer 15 associated with phase conductors 3 and 5, contacts 27, contacts 22 of fault-responsive relay 19, and contacts 21 of fault-responsive relay 18 and impedance device 23. Consequently, the relay is energized in accordance with the voltage between the conductors 3 and 5 so that it has a considerably greater release time than the distance relay in the station in which the fault current flows in the phase conductor 5. Therefore, the double earth fault is cut out only in the phase in which the fault current flows in the phase conductor 5 and only when that relay fails to operate does the relay in the station through which the fault current flows in the phase conductor 3 operate.

The fault-responsive means 25 which responds to a double-earth fault is shown as an undervoltage relay connected across the phase conductors 3 and 5. This relay can be constructed as a voltage comparison relay if it is under the influence of the voltage between the phase conductors 3 and 5 and the voltage between the phase conductors 3 and 4 or 4 and 5 so as to respond when there is a voltage drop less than a certain amount which indicates a reduction in the voltage between the phase conductors 3 and 5.

If the arrangement is to be carried out using only two current transformers, then the relays associated with the phase without a current transformer can be connected to be energized by the sum of the currents in the other two phase conductors in a manner which is well known to the art.

With power systems in which the earth conductor has a comparatively high impedance, it may be desirable to place an impedance device 28 in the earth connection, as shown in Figs. 1 and 2 for example, so as to compensate for the effect of the high ground resistance on the impedance characteristic setting of the relay.

What I claim as new and desire to secure by Letters Patent of the United States, is:

1. A protective arrangement for a polyphase alternating-current power system including distance relays having cooperating voltage and current coils one terminal of each of the voltage coils being directly connected to the same point and the current coils being connected to be energized respectively in accordance with the currents in the phase conductors of the system, and fault-responsive relays respectively associated with the phase conductors of the system and means including contacts controlled by said fault-responsive relays for normally connecting the other terminal of each voltage coil to a neutral point of the system and for connecting the other terminal of each voltage coil to the phase conductor of the system from which the cooperating current coil is energized upon the occurrence of a fault involving said phase conductor.

2. A protective arrangement for a polyphase alternating-current power system including distance relays having cooperating current and voltage coils, the current coils being connected to be energized respectively in accordance with the currents in the phase conductors of the system and each of the voltage coils having substantially the same impedance and also having one terminal connected to a common point, fault-responsive relays respectively associated with the phase conductors of the system and means including contacts controlled by said fault-responsive relays for normally connecting the other terminal of each voltage coil to a neutral point of the system through the contact of the associated fault-responsive relay and the contact of the fault-responsive relay of the phase next in cyclic order.

3. A protective arrangement for a polyphase alternating-current power system including distance relays having voltage coils, one terminal of each voltage coil being connected to a common point and fault-responsive starting relays respectively associated with the phase conductors of said system; characterized by the fact that the other terminal of each of said voltage coils is normally connected to a neutral point of the system through the contacts of at least two of the starting relays and that on the occurrence of a fault involving two phase conductors the other terminals of the voltage coils of two of the distance relays are respectively connected to the faulted phase conductors through the contacts of the starting relays associated with the faulted phase conductors.

4. In a polyphase alternating-current power system wherein distance relays have voltage coils connected to be energized from the system, one terminal of each of the voltage coils being connected to a common point and wherein fault-responsive starting relays are connected to be energized in accordance with the currents in the respective phase conductors of the system; means including contacts associated with said fault-responsive relays for normally connecting the other terminal of each voltage coil to a neutral point of the system through the contact of the associated fault-responsive relay and the contact of the fault-responsive relay of the phase next in cyclic order.

5. A protective arrangement for a polyphase alternating-current power system including distance relays having cooperating voltage and current coils each of the voltage coils having substantially the same impedance and also having one terminal directly connected to the same point and the current coils being connected to be energized in accordance with the currents in the respective phase conductors of the system, and means for controlling the connections of the other terminal of each voltage coil whereby to maintain the distance-response characteristic of the distance relays substantially constant for faults at a given location independently of the number of phase conductors involved including fault-responsive relays respectively associated with the phase conductors of the system and means including contacts controlled by said fault-responsive relays for normally connecting the other terminal of each voltage coil to a neutral point of the system and for connecting the other terminal of each voltage coil to the phase conductor of the system from which the cooperating current coil is energized upon the occurrence of a fault involving said phase conductor.

6. A protective arrangement for a polyphase alternating-current power system including a distance relay for each phase but one of the system, each distance relay having cooperating current and voltage coils, the current coils being connected to be energized respectively in accordance with the currents in certain phase conductors of the system and one terminal of each of the voltage coils being connected to a common point, means having an impedance equivalent to the impedance of one of said voltage coils and having one terminal connected to the common point, fault-responsive relays associated with the respective phase conductors of the system and means including contacts controlled by said fault-responsive relays for normally connecting the other terminal of each voltage coil and of said equivalent impedance means to a neutral point of the system and for connecting the other terminal of each voltage coil and of said equivalent impedance means to the phase conductor with which the fault-responsive relay is associated.

ROLF WIDERÖE.